(12) United States Patent  (10) Patent No.: US 7,920,324 B2
Holmes  (45) Date of Patent: Apr. 5, 2011

(54) SYSTEM AND METHOD FOR TELESCOPE GUIDING UTILIZING AN ARTIFICIAL REFERENCE STAR

(75) Inventor: Alan W. Holmes, Goleta, CA (US)

(73) Assignee: Aplegen, Inc., Santa Barbara, CA (US)

( * ) Notice: Subject to any disclaimer, the term of this patent is extended or adjusted under 35 U.S.C. 154(b) by 973 days.

(21) Appl. No.: 11/788,522

(22) Filed: Apr. 19, 2007

(65) Prior Publication Data

US 2008/0259448 A1 Oct. 23, 2008

(51) Int. Cl.
 *G02B 23/00* (2006.01)
(52) U.S. Cl. .................... 359/429; 359/529; 250/203.2; 382/103; 382/107
(58) Field of Classification Search .................. None
See application file for complete search history.

(56) References Cited

U.S. PATENT DOCUMENTS

| | | | |
|---|---|---|---|
| 5,150,256 A * | 9/1992 | Dey | 359/428 |
| 5,365,269 A | 11/1994 | Holmes et al. | 348/297 |
| 5,525,793 A | 6/1996 | Holmes et al. | 250/203.6 |
| 2006/0171560 A1 * | 8/2006 | Manus | 382/103 |

FOREIGN PATENT DOCUMENTS

| | | |
|---|---|---|
| DE | 298317 A5 | 2/1992 |
| JP | 2000305024 A | 11/2000 |

OTHER PUBLICATIONS

Gardner, C. S. et al., "Design and Performance Analysis of Adaptive Optical Telescopes Using Laser Guide Stars", Proceedings of the IEEE, IEEE., New York, vol. 78, No. 11, Nov. 1, 1990, pp. 1721-1743.
PCT Notification of the International Search Report and the Written Opinion of the International Searching Authority, Dated Jul. 21, 2008; for International Application No. PCT/US2008/004017.

* cited by examiner

*Primary Examiner* — Stephone B Allen
*Assistant Examiner* — Derek S Chapel
(74) *Attorney, Agent, or Firm* — Koppel, Patrick, Heybl & Dawson

(57) ABSTRACT

A system and method for telescope guiding requires creating an artificial reference star which is locked to the line of sight of the imaging means of a main telescope in the field-of-view (FOV) of a guide scope. A real guide star is selected using the guide scope, such that both artificial and guide stars are within the FOV of the guide scope. Guiding is accomplished by varying the line of sight such that the positional displacement between the guide and artificial stars on the guide star's focal plane is maintained approximately constant. The artificial star is created by generating a point source of light near the main scope's imaging means, directing the light outside the main scope and retroreflecting it at the same direction angle of the beam exiting the aperture into the guide scope, effectively locking the guide scope to the line of sight of the imaging means.

25 Claims, 4 Drawing Sheets

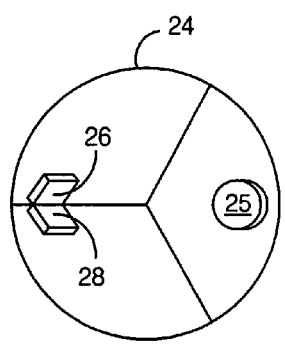
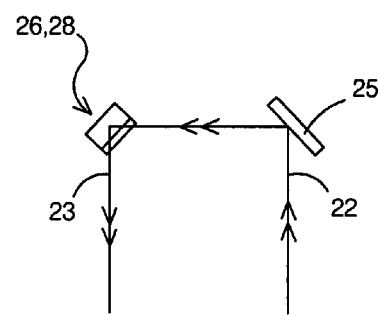
FIG.3a　　　　　　　FIG.3b
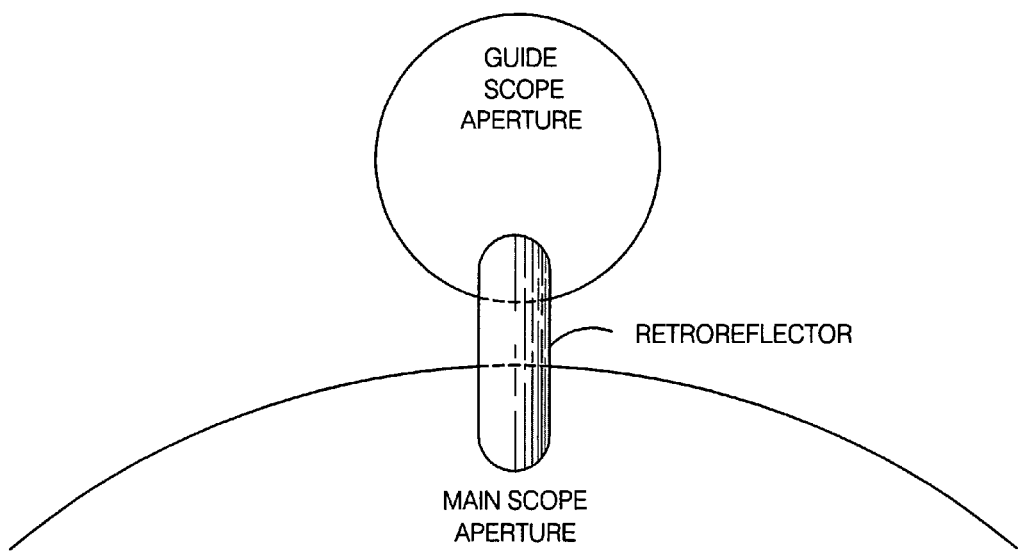
FIG.5

SYSTEM AND METHOD FOR TELESCOPE GUIDING UTILIZING AN ARTIFICIAL REFERENCE STAR

BACKGROUND OF THE INVENTION

1. Field of the Invention

This invention relates generally to the field of telescopes, and more particularly to systems and methods for telescope guiding.

2. Description of the Related Art

Images of celestial objects are typically captured using a telescope, to which an imaging device such as the charge-coupled device (CCD) array of a camera has been coupled. In some cases, particularly when the object is dim, a long exposure time is required to gather enough light to form a useful image. When this is the case, it is necessary to adjust or "guide" the position of the telescope during the exposure, to ensure that the object remains accurately positioned on the imaging device. "Clock drives" which compensate for the earth's rotation are commonly employed; however, occasional correction is typically required to maintain a desired accuracy.

Many techniques have been employed to provide the necessary guiding. One common method involves the use of a "guide" scope which is attached to the main telescope. The guide scope is used to find a bright "guide" star, and a means is provided for repositioning the telescope as needed to keep the guide scope locked onto on the selected guide star, thereby keeping the main scope aligned on the object of interest.

One possible guiding technique is described in U.S. Pat. No. 5,525,793 to Holmes et al. Here, an "imaging CCD" and a "guide CCD" are positioned on a common focal plane. The guide CCD is used to lock the telescope onto an off-axis guide star, while the imaging CCD accumulates a long exposure image, which can take place over a period of minutes or hours.

This technique generally works well, but suffers from several problems. For example, in some cases, a filter is employed in front of the imaging CCD, in order to capture one component of a color image. However, with both CCDs on a common focal plane, the filter will also be in front of the guide CCD, thereby reducing the spectral passband of the light reaching the guide CCD. This requires the selected guide star to be bright enough to get through the filter, thereby reducing the pool of useable guide stars. The same is true when using a passband filter for photometry purposes.

Another problem is that, at longer focal lengths and larger F/numbers, good guide stars are relatively uncommon, forcing a user to either offset his imaging CCD from the object being imaged to find a guide star, or to rotate the whole assembly to find a guide star. Both are detrimental to astrophotography, since the imaging CCD is expensive in large sizes, and it is frustrating to have to lose the proper framing of a scene to find a guide star, effectively wasting a portion of the CCD area.

One approach to overcoming the problems described above is to locate the guide CCD in a separate housing in front of the filter, and use a beamsplitter or pickoff mirror to direct light from a guide star received via the main scope's aperture to the guide CCD. However, with this arrangement, the guide CCD still only views a small area of sky, and requires offsetting or rotating the main CCD to find a guide star. Another problem in practice is that, if filters are used with different thicknesses, the user must refocus the guide CCD when changing filters.

Another solution is to locate the guide CCD in a separate housing on a guide telescope parallel to but offset from the main telescope tube. This allows the guide scope to receive light without any intervening filters, and to have a short focal length and fast F/ratio, making it much easier to find a guide star. However, the problem with this approach is that any mechanical deflection of the guide scope relative to the main scope will cause guiding errors, resulting in elongated stars and ruining the image. A guiding error of as little as one arc-second—which is a mechanical displacement of only 60 micro-inches across a 12 inch baseline, typical of guide scope support clamp spacing—can be deleterious. As the main telescope is rotated to follow a star, the gravity vector shifts and the support structure can deflect—and even the main telescope tube can bend slightly—shifting the image by an amount much greater than one arc-second.

One other problem should be noted. Most telescope mounts are massive, supporting hundreds of pounds of telescopes and counterweights, and have difficulty making fast, accurate correction of the star image position on the imaging CCD. To avoid having to move the entire telescope when just a fine adjustment is needed, users can employ an "active optical" (AO) device. Such devices, such as a tip-tilt mirror or a tilting thick glass plate, are positioned between the imaging CCD and the main telescope's aperture, and are moved as needed to achieve responsive guiding. However, this arrangement is not possible when a separate guide scope is used, since the guide CCD does not view the sky through the AO device. Thus, the solution that makes finding guide stars easiest cannot be used to control an AO device in the closed loop manner that is required for accurate guiding.

SUMMARY OF THE INVENTION

A system and method for telescope guiding is presented which overcomes the problems noted above. An artificial reference star is created which is locked to the line of sight of the imaging means of a main telescope in the field-of-view (FOV) of a guide scope. A real guide star is selected using the guide scope, such that both the artificial and guide stars are within the FOV of the guide scope; the guide scope has an associated focal plane on which both artificial and real guide stars are focused. Guiding is accomplished by varying the line of sight such that the positional displacement between the selected real guide star and the artificial star on the guide scope's focal plane is maintained approximately constant.

The artificial reference star is preferably created by generating a point source of light in the vicinity of the imaging means within the main telescope, directing the light from the point source outside of the main telescope via its aperture, and retroreflecting the output beam at the same direction angle of the beam exiting the aperture into the guide scope. This effectively locks the guide scope to the line of sight of the imaging means, and makes it possible to guide the main scope by maintaining the positional displacement between the selected guide star and the artificial star on the guide scope's focal plane approximately constant.

The wavelength of the output beam is preferably outside the spectral passband of the imaging means, which is typically a CCD array. If needed, filters can be placed between the point source of light and the imaging means to limit the amount of point source light that impinges on the imaging means.

The present method and system can be used with telescopes employing an AO device in front of its imaging means, as long as the light from the point source also passes through the AO device.

BRIEF DESCRIPTION OF THE DRAWINGS

FIGS. 3a and 3b are diagrams of a retroreflector as might be used as part of a telescope guiding method and system in accordance with the present invention.

FIG. 4b is a simplified front elevation view of the components shown in FIG. 4a.

FIG. 5 is a diagram showing the relationship between a retroreflector and main and guide scope apertures in accordance with the present invention.

DETAILED DESCRIPTION OF THE INVENTION

The new method of guiding an optical device is described. The method is applicable whenever there is a guide means which facilitates the proper positioning of a main imaging means. A primary application is a telescope system having a main scope, the positioning of which is facilitated with the use of a guide scope.

The method involves creating an artificial reference star in the FOV of a guide scope which is locked to the line of sight of the imaging means of the main scope. A real guide star is selected which is within the FOV of the guide scope; the guide scope has an associated focal plane on which both artificial and real guide stars are focused. Guiding of the main scope is effected by maintaining its line of sight such that the positional displacement between the selected real guide star and the artificial star on the guide scope's focal plane is maintained approximately constant.

Figure 1:
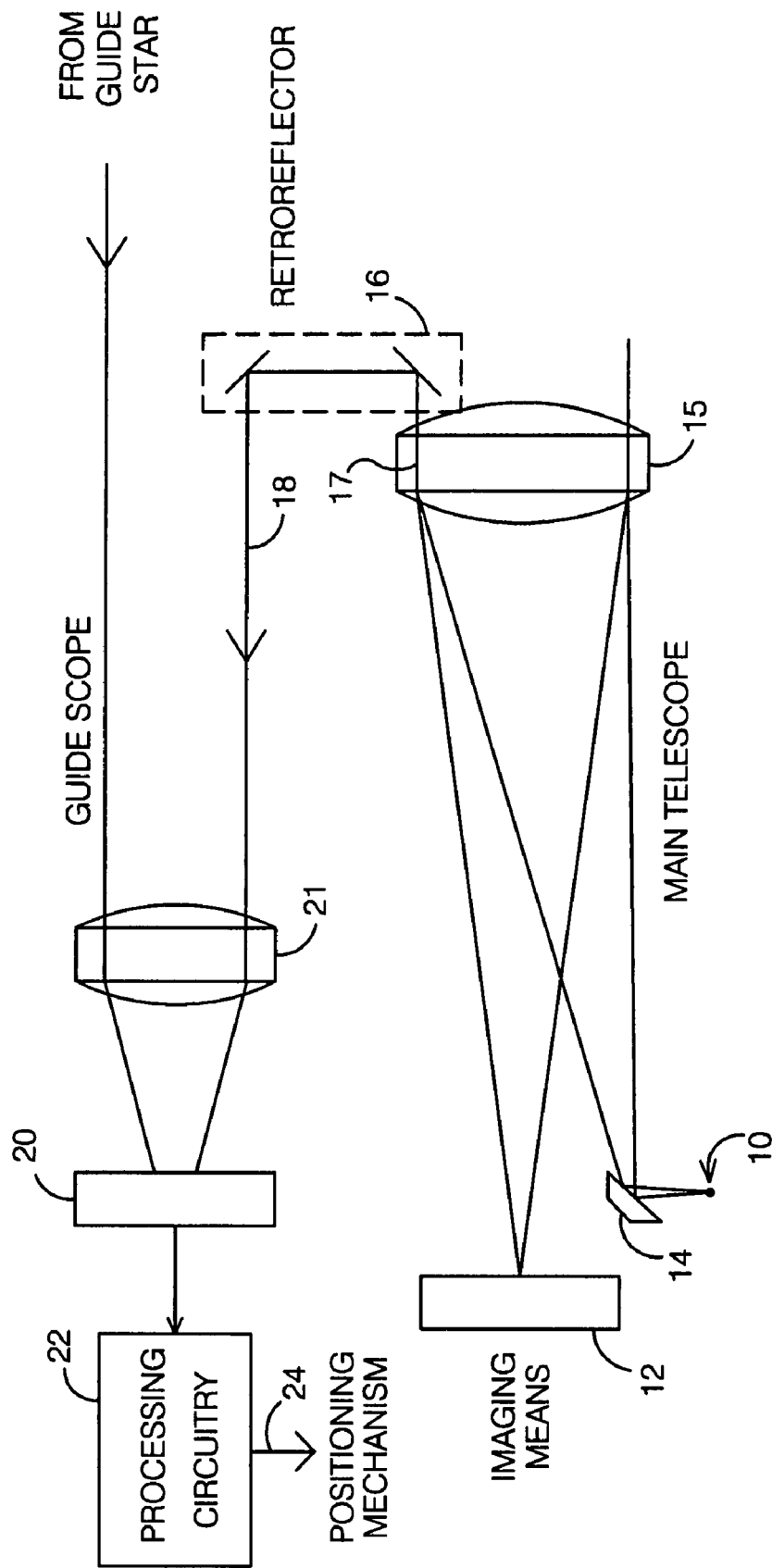
FIG. 1 is diagram illustrating the basic principles of a telescope guiding method and system in accordance with the present invention.

One possible embodiment of a guide means per the present invention is shown in FIG. 1. A point source of light 10 is generated in the vicinity of the main scope's imaging means 12, and light from the point source is directed away from imaging means 12 and toward the sky by a beamsplitter, prism or small mirror 14. Light from point source 10 passes through one or more of the main scope's optical elements 15, exits via its aperture, and is received by a retro-reflector 16; this light is referred to herein as the "output beam" 17. Retro-reflector 16 both displaces a portion of the output beam to a location outside of the telescope tube, and retroreflects it back at the exact direction angle of the beam exiting the aperture. This small retroreflected beam 18 is directed into the separate guide scope, where it is collected and directed onto the guide scope's imaging means 20 by an lens or mirror assembly 21 that also collects and focuses light from the star field that the guider views through the portion of the guide scope aperture not blocked by the retroreflector. The image acquired by imaging means 20 is presented to the guider, which selects a real guide star from the star field.

When so arranged, the point light source 10 creates an artificial reference star on guide scope imaging means 20. Guiding is then effected by maintaining the main scope's line of sight such that the positional displacement between the selected real guide star and the artificial star on imaging means 20 is maintained approximately constant. This is accomplished by, for example, using processing circuitry 22 to receive imaging data from guide scope imaging means 20, and to generate control signals 24 to a positioning mechanism capable of varying the line of sight.

Figure 2:
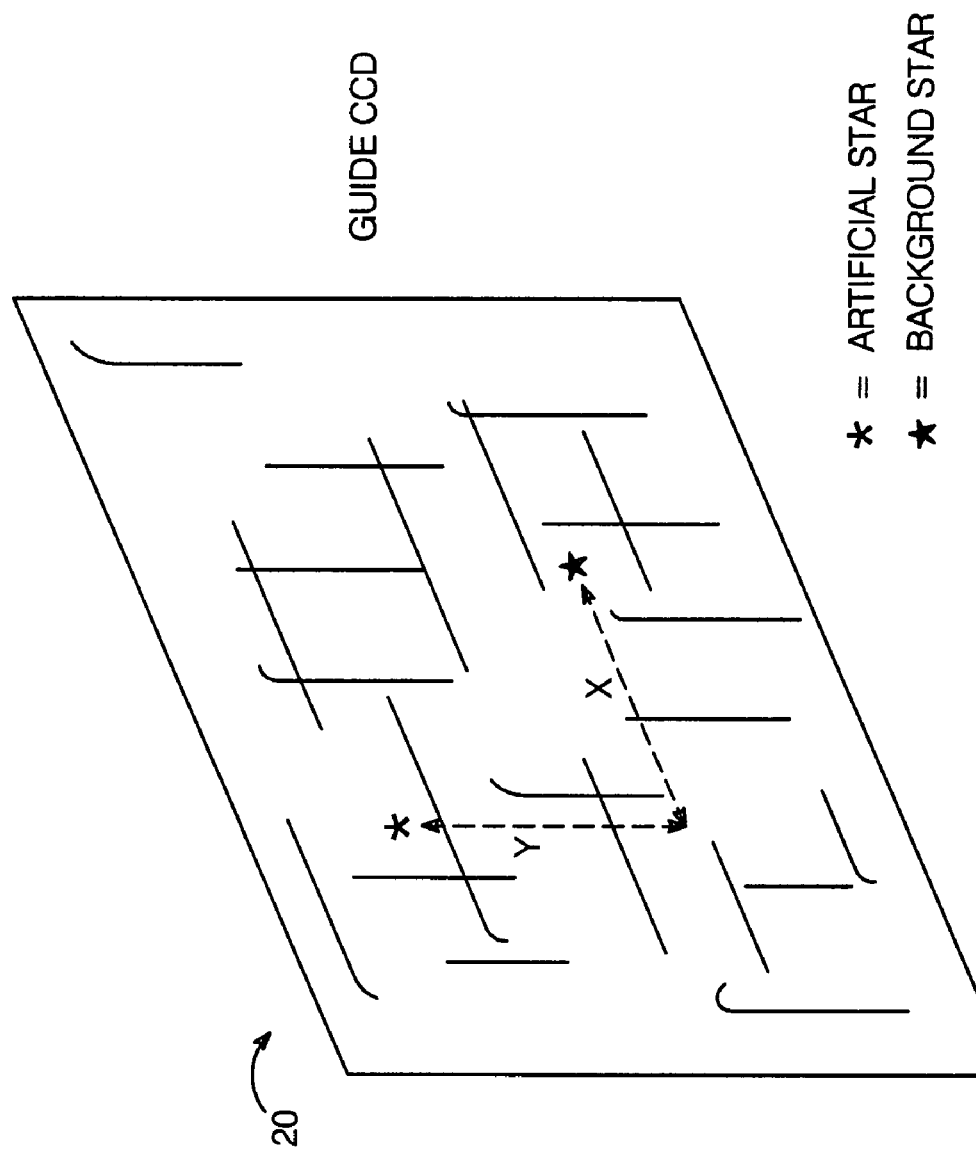
FIG. 2 is a view of a CCD array on which real guide and artificial stars are imaged in accordance with the present invention.

Guide scope imaging means 20 is preferably a CCD array; a simplified illustration of such an array is shown in FIG. 2. In this example, light from the artificial star and the selected guide star is focused on the CCD array at the locations indicated. The output of the array is provided to processing circuitry 22, which controls the positioning mechanism such that the X and Y separation between the two stars is maintained.

Maintaining the X-Y displacement could be accomplished by varying the position of the main scope as needed to maintain the X and Y separation over time. Alternatively, a telescope may employ an active optical (AO) device positioned within the main scope in front of its imaging means (discussed in more detail below). In this case, the positioning mechanism may vary the position of the main telescope and/or the AO device as needed to maintain the X-Y displacement over time.

The point source of light preferably operates at a wavelength which is outside the spectral passband of main scope imaging means 12, so as not to adversely affect the acquired image. Imaging means 12 is preferably a CCD array, and the artificial star preferably comprises light from the near infrared spectrum, generated with an LED or laser diode.

Retroreflector 16 is preferably comprised of three mutually perpendicular mirrors arranged to form a corner cube optical element. A diagram of such a retroreflector is shown in FIGS. 3a and 3b; the diagram in FIG. 3b, if rotated so that the incoming (22) and retroreflected (23) beams are perpendicular to the page, correlates with FIG. 3a. FIG. 3a illustrates how the mirrors are oriented to match the surfaces of a larger, more conventional corner cube geometry (24). A solid glass corner cube module can be prohibitively heavy in the sizes required here, so three mirrors are employed, held in the correct alignment by a metal structure. The three mirrors consist of a flat mirror 25, and two mirror segments 26 and 28 having a 90 angle between them which form a "roof" mirror, mirrors 25, 26 and 28 being mutually perpendicular.

To maintain guiding accuracy, it is important that careful attention be paid to the retroreflector's thermal expansion characteristics, and to any deflection of the output and/or retroreflected beams due to gravitationally induced bending of the retroreflector. The retroreflector housing is preferably made from a material that minimizes bending; an aluminum tube of fixed length is preferred.

Figure 4A:
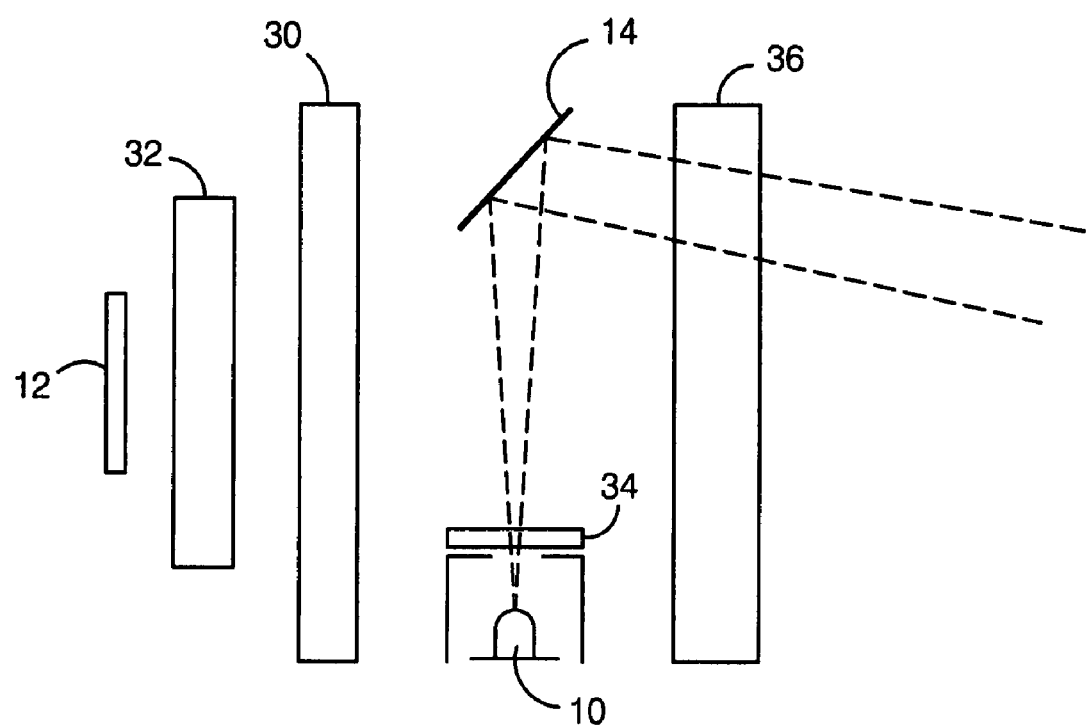
FIG. 4a is a simplified side elevation view of components that could be employed in the vicinity of the main scope's imaging means to generate the artificial reference star in accordance with the present invention.
Figure 4B:
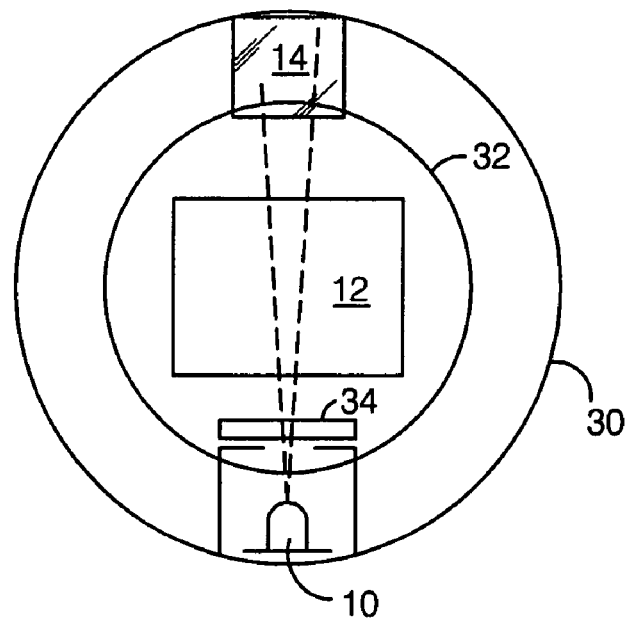

For accurate guiding, it is important that point source 10 be in close proximity to and in a fixed relationship with imaging means 12. One concern of this technique is that light from point source 10 may be detected by the imaging means, typically a very sensitive CCD array. To avoid this, one or more filters can be used to prevent light from point source 10 from affecting an image captured by the imaging means 12. This is illustrated in FIGS. 4a and 4b, which depict simplified side and front elevation views, respectively, of components that could be employed in the vicinity of imaging means 12. For example, if imaging means 12 is part of a commercial digital camera for general purpose photography, it usually has a filter glass 30 that blocks light having wavelengths longer than 700 nm from reaching it. If point source 10 is, for example, an LED having a peak wavelength near 940 nm, then its light will not pass through filter 30 and corrupt the image.

A shortpass filter 32 may be placed in front of imaging means 12 to block the point source light; this might be especially necessary if imaging means 12 is a scientific CCD array. For example, if point source 10 is a 940 nm LED, and shortpass filter 32 blocks light beyond 800 nm from reaching the imaging means, then the LED will not produce any deleterious effect.

A longpass filter 34 may also need to be placed directly in front of point source 10 to limit the shorter wavelengths emitted by the device. For example, if a 940 nm LED is used, a RG850 Schott filter glass would work to prevent significant energy below 800 nm from reaching imaging means 12.

As mentioned above, an active optical (AO) device 36 can be positioned within the main scope in front of its imaging means, as shown in FIG. 4a (not shown in FIG. 4b for clarity). AO device 36 could be, for example, a tip-tilt mirror or a tilting thick glass plate, the position of which is varied to provide responsive guiding. Note that the light from point source 10 also transits through the AO device, thereby enabling guide scope imaging means 20 and processing circuitry 22 to provide closed loop control of the AO device. For example, processing circuitry 22 might adjust the position of AO device 36 after downloading each frame from guide scope imaging means 20, and looking at average correction levels applied to the AO device over a period of time to correct the mount to a neutral guide correction point. In essence, the artificial star marks the position of imaging means 12 in the sky (but offset).

One advantage of the arrangement described herein is that the point source-derived beam exiting the telescope is about F/50 to F/100. This means its depth of field is very large. The shorter focal length of the guide scope demagnifies retroreflected beam 18, keeping it starlike on the guide scope's imaging means.

Note that, since retroreflector 16 receives light via the aperture of the main scope and reflects it into the aperture of the guide scope, it necessarily infringes on each scope's FOV. This is illustrated in FIG. 5. However, only a small portion of each scope's aperture is obscured; as such, the negative effect of the retroreflector on the system's use is relatively small.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A method of controlling the positioning of a main telescope having an associated guide scope and an imaging means, comprising:
    creating an artificial reference star in the field-of-view (FOV) of said guide scope which is locked to the line of sight of the imaging means of said main telescope;
    selecting a real guide star which is within the FOV of said guide scope, said guide scope having an associated focal plane on which said artificial and real guide stars are focused; and
    maintaining said line of sight such that the positional displacement between said selected real guide star and said artificial star on said guide scope's focal plane is maintained approximately constant;
    wherein said creating of said artificial star comprises:
        generating a point source of light in the vicinity of said imaging means within said main telescope;
        directing light from said point source outside of said main telescope via its aperture, said light from said point source exiting said aperture being an output beam; and
        retroreflecting said output beam at the same direction angle of the beam exiting the aperture into said guide scope.

2. The method of claim 1, wherein said imaging means is a charge-coupled device (CCD) array.

3. The method of claim 1, wherein said guide scope's focal plane is established by a guide scope imaging means upon which light from said artificial and real guide stars impinges, said guide scope's imaging means comprising a charge-coupled device (CCD) array, said positional displacement corresponding to the x-y displacement between said artificial and real guide stars as detected on said guide CCD.

4. The method of claim 1, wherein said retroreflecting is accomplished with a retroreflector comprising three mutually perpendicular minors arranged to form a corner cube optical element.

5. The method of claim 1, wherein the wavelength of said light from said point source is outside the spectral passband of said imaging means.

6. The method of claim 5, wherein said wavelength of said light from said point source is in the near infrared portion of the spectrum.

7. The method of claim 1, further comprising:
    providing a filter between said point source of light and said imaging means to limit the amount of said light that impinges on said imaging means.

8. The method of claim 1, wherein varying said line of sight comprises controlling the position of said main telescope.

9. The method of claim 1, wherein varying said line of sight comprises controlling the position of an active optical device located between said imaging means and said aperture which can be moved to provide responsive guiding.

10. A system for controlling the positioning of a main telescope, said main telescope containing an imaging means and having an associated guide scope through which a guide star is selected, comprising:
    a point source of light located in the vicinity of the imaging means within said main telescope;
    a means for directing the light from said point source outside of said main telescope via its aperture, said light from said point source exiting said aperture being an output beam;
    a retroreflector which retroreflects said output beam at the same direction angle of the beam exiting the aperture into said guide scope such that an artificial reference star is created in said guide scope's field-of-view that is locked to the line of sight of said imaging means, said guide scope having an associated focal plane on which said artificial and guide stars are focused; and
    a means for varying said line of sight such that the positional displacement between said selected guide star and said artificial star on said guide scope's focal plane is maintained approximately constant.

11. The system of claim 10, wherein said imaging means is a charge-coupled device (CCD) array.

12. The system of claim 10, wherein said point source is arranged such that the wavelength of said light from said point source is outside the spectral passband of said imaging means.

13. The system of claim 12, wherein said point source is arranged such that the wavelength of said light from said point source is in the near infrared portion of the spectrum.

14. The system of claim 10, wherein said point source of light is a light-emitting diode.

15. The system of claim 10, wherein said point source of light is a laser diode.

16. The system of claim 10, further comprising a filter positioned between said point source of light and said imaging means and arranged to limit the amount of said light that impinges on said imaging means.

17. The system of claim 16, wherein said filter is a longpass filter positioned directly in front of the point source so as to limit shorter wavelengths emitted by said point source from impinging on said imaging means.

18. The system of claim 16, wherein said filter is a shortpass filter positioned in front of said imaging means so as to limit longer wavelengths emitted by said point source from impinging on said imaging means.

19. The system of claim 10, wherein said means for directing the light from said point source comprises a prism, a beamsplitter, or a mirror.

20. The system of claim 10, wherein said retroreflector comprises three mutually perpendicular mirrors arranged to form a corner cube optical element.

21. The system of claim 10, wherein said guide scope's focal plane is established by a charge-coupled device (CCD) array on which light from said selected real guide star and said artificial star impinges.

22. The system of claim 10, wherein said means for varying said line of sight comprises a means for controlling the position of said main telescope.

23. The system of claim 10, further comprising an active optical (AO) device positioned between said imaging means and said aperture which can be moved to provide responsive guiding, said point source and said means for directing the light from said point source arranged such that said light from said point source passes through said AO device before exiting said main telescope.

24. The system of claim 23, wherein said means for varying said line of sight comprises a means for controlling the position of said AO device.

25. The system of claim 10, wherein said imaging means comprises a digital camera.

* * * * *